United States Patent
Sugama

(10) Patent No.: US 8,169,543 B2
(45) Date of Patent: May 1, 2012

(54) IMAGE CONVERSION DEVICE AND METHOD FOR CONVERTING A FIELD IMAGE INTO A FRAME IMAGE

(75) Inventor: Yasushi Sugama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 372 days.

(21) Appl. No.: 12/556,289

(22) Filed: Sep. 9, 2009

(65) Prior Publication Data

US 2010/0073557 A1 Mar. 25, 2010

Related U.S. Application Data

(63) Continuation of application No. PCT/JP2007/000236, filed on Mar. 16, 2007.

(51) Int. Cl.
*H04N 7/01* (2006.01)

(52) U.S. Cl. ..................................... 348/448

(58) Field of Classification Search .................. 348/448, 348/441, 452, 458, 459, 699–701; 382/199, 382/261, 266, 260
See application file for complete search history.

(56) References Cited

U.S. PATENT DOCUMENTS

| | | | | |
|---|---|---|---|---|
| 6,133,957 A | * | 10/2000 | Campbell | 348/458 |
| 6,924,844 B2 | * | 8/2005 | Kawamura et al. | 348/448 |
| 7,161,602 B2 | * | 1/2007 | Shan | 345/606 |
| 7,218,354 B2 | * | 5/2007 | Tanaka | 348/448 |
| 7,336,316 B2 | * | 2/2008 | Fazzini | 348/448 |
| 7,362,376 B2 | * | 4/2008 | Winger et al. | 348/448 |
| 7,403,234 B2 | * | 7/2008 | Lertrattanapanich et al. | 348/448 |
| 7,474,789 B2 | * | 1/2009 | Wang et al. | 382/199 |
| 7,893,993 B2 | * | 2/2011 | Winger et al. | 348/448 |
| 2003/0011708 A1 | * | 1/2003 | Kawamura et al. | 348/448 |

FOREIGN PATENT DOCUMENTS

| | | |
|---|---|---|
| EP | 1 343 116 A1 | 9/2003 |
| JP | 2001-94951 | 4/2001 |
| JP | 2002-112203 | 4/2002 |
| JP | 2003-52023 | 2/2003 |
| JP | 2004-72528 | 3/2004 |
| JP | 2004-274361 | 9/2004 |
| WO | 02/48965 A1 | 6/2002 |

OTHER PUBLICATIONS

International Search Report for PCT/JP2007/000236, mailed May 22, 2007.

* cited by examiner

*Primary Examiner* — Paulos Natnael
(74) *Attorney, Agent, or Firm* — Fujitsu Patent Center

(57) ABSTRACT

In an image conversion device, a unit calculates an estimate pixel value for comparing an upper line pixel value with a lower line pixel value using the upper line pixel value corresponding to a plurality of consecutive pixels to be interpolated in a line between adjacent upper and lower lines in a field image and calculates an estimate pixel value for comparing the lower line pixel value with the upper line pixel value using the lower line pixel value; a unit searches for a combination of an estimate pixel value to minimize the sum of an absolute value of a difference between the estimate pixel value for the upper line and an upper line pixel value and an absolute value of a difference between the estimate pixel value for the lower line and a lower line pixel value; and a unit interpolates a pixel value for the minimizing combination.

7 Claims, 43 Drawing Sheets

RELATED ART

F I G. 1

| | | | | 63 | 11 | 29 | 41 | 46 | 14 | 26 | 16 | 19 | | | | | |
|---|---|---|---|---|---|---|---|---|---|---|---|---|---|---|---|---|---|
| | | | | | | | | | | | | | | | | | |
| | | | | 14 | 25 | 60 | 43 | 23 | 34 | 15 | 53 | 38 | | | | | |

RELATED ART

FIG. 2

PIXEL TO BE INTERPOLATED

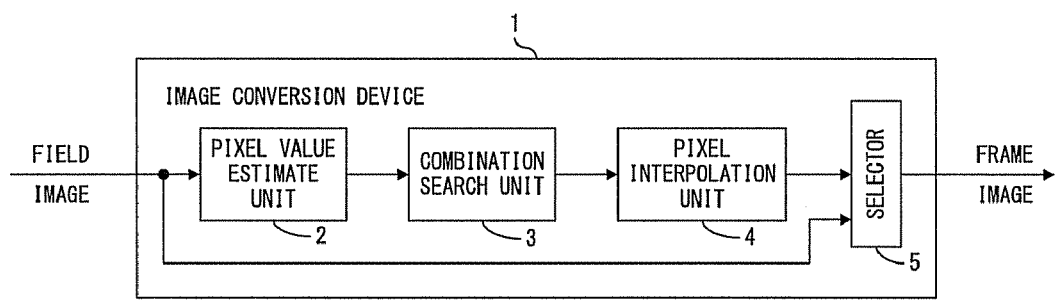
F I G. 4

SLANT NUMBER 0

| | | | | | | | | | | | | | | | | | | | | | |
|---|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
| ESTIMATE PIXEL (LOWER) | | | | | | | | | p0 | p1 | p2 | p3 | | | | | | | | | | y=1

| | | | | | | | | | | | | | | | | | | | | | |
|---|---|---|---|---|---|---|---|---|---|---|---|---|---|---|---|---|---|---|---|---|---|
| ESTIMATE PIXEL (UPPER) | | | | | | | | | q0 | q1 | q2 | q3 | | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=u16  q0=d0
p1=u17  q1=d1
p2=u18  q2=d2
p3=u19  q3=d3

F I G. 6

SLANT NUMBER 1

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
|---|---|---|---|---|---|---|---|---|---|---|---|---|---|---|---|---|---|---|---|---|---|
| ESTIMATE PIXEL (LOWER) | | | | | | | | | p0 | p1 | p2 | p3 | | | | | | | | | | y=1

| ESTIMATE PIXEL (UPPER) | | | | | | | | | q0 | q1 | q2 | q3 | | | | | | | | | |
|---|---|---|---|---|---|---|---|---|---|---|---|---|---|---|---|---|---|---|---|---|---|
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=(u15+u16)/2    q0=(d0+d1)/2
p1=(u16+u17)/2    q1=(d1+d2)/2
p2=(u17+u18)/2    q2=(d2+d3)/2
p3=(u18+u19)/2    q3=(d3+d4)/2

F I G. 7

SLANT NUMBER 2

| | | | | | | | | | | | | | | | | | | | | | |
|---|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
| ESTIMATE PIXEL (LOWER) | | | | | | | | | | | | | | | | | | | | | | y=1

| | | | | | | | | | | | | | | | | | | | | | |
|---|---|---|---|---|---|---|---|---|---|---|---|---|---|---|---|---|---|---|---|---|---|
| ESTIMATE PIXEL (UPPER) | | | | | | | | | q0 | q1 | q2 | q3 | | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=u15  q0=d1
p1=u16  q1=d2
p2=u17  q2=d3
p3=u18  q3=d4

F I G. 8

SLANT NUMBER 3

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
|---|---|---|---|---|---|---|---|---|---|---|---|---|---|---|---|---|---|---|---|---|---|
| ESTIMATE PIXEL (LOWER) | | | | | | | | | p0 | p1 | p2 | p3 | | | | | | | | | | y=1

| ESTIMATE PIXEL (UPPER) | | | | | | | | | q0 | q1 | q2 | q3 | | | | | | | | | |
|---|---|---|---|---|---|---|---|---|---|---|---|---|---|---|---|---|---|---|---|---|---|
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=(u14+u15)/2   q0=(d1+d2)/2
p1=(u15+u16)/2   q1=(d2+d3)/2
p2=(u16+u17)/2   q2=(d3+d4)/2
p3=(u17+u18)/2   q3=(d4+d5)/2

F I G. 9

SLANT NUMBER 4

| | | | | | | | | | | | | | | | | | | | | | |
|---|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
| ESTIMATE PIXEL (LOWER) | | | | | | | | | | | p0 | p1 | p2 | p3 | | | | | | | | y=1

| | | | | | | | | | | | | | | | | | | | | | |
|---|---|---|---|---|---|---|---|---|---|---|---|---|---|---|---|---|---|---|---|---|---|
| ESTIMATE PIXEL (UPPER) | | | | | | | | | q0 | q1 | q2 | q3 | | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=u14  q0=d2
p1=u15  q1=d3
p2=u16  q2=d4
p3=u17  q3=d5

F I G. 1 0

SLANT NUMBER 5

| | u0 | u1 | u2 | u3 | u4 | u5 | u6 | u7 | u8 | u9 | u10 | u11 | u12 | u13 | u14 | u15 | u16 | u17 | u18 | u19 |
|---|---|---|---|---|---|---|---|---|---|---|---|---|---|---|---|---|---|---|---|---|
| ACTUAL PIXEL (UPPER) | | | | | | | | | | | | | | | | | | | | |
| ESTIMATE PIXEL (LOWER) | | | | | | | | | | | p0 | p1 | p2 | p3 | | | | | | | y=0 y=1

| | | | | | | | | | q0 | q1 | q2 | q3 | | | | | | | | |
|---|---|---|---|---|---|---|---|---|---|---|---|---|---|---|---|---|---|---|---|---|
| ESTIMATE PIXEL (UPPER) | | | | | | | | | | | | | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2

$p0 = (u13+u14)/2$  $q0 = (d2+d3)/2$
$p1 = (u14+u15)/2$  $q1 = (d3+d4)/2$
$p2 = (u15+u16)/2$  $q2 = (d4+d5)/2$
$p3 = (u16+u17)/2$  $q3 = (d5+d6)/2$

F I G. 1 1

SLANT NUMBER 6

| | | | | | | | | | | | | | | | | | | | | | |
|---|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
| ESTIMATE PIXEL (LOWER) | | | | | | | | | | p0 | p1 | p2 | p3 | | | | | | | | | y=1

| | | | | | | | | | | | | | | | | | | | | | |
|---|---|---|---|---|---|---|---|---|---|---|---|---|---|---|---|---|---|---|---|---|---|
| ESTIMATE PIXEL (UPPER) | | | | | | | | q0 | q1 | q2 | q3 | | | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=u13  q0=d3
p1=u14  q1=d4
p2=u15  q2=d5
p3=u16  q3=d6

F I G. 1 2

SLANT NUMBER 7

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
| --- | --- | --- | --- | --- | --- | --- | --- | --- | --- | --- | --- | --- | --- | --- | --- | --- | --- | --- | --- | --- | --- |
| ESTIMATE PIXEL (LOWER) | | | | | | | | | | | p0 | p1 | p2 | p3 | | | | | | | | y=1

| ESTIMATE PIXEL (UPPER) | | | | | | | | | q0 | q1 | q2 | q3 | | | | | | | | | |
| --- | --- | --- | --- | --- | --- | --- | --- | --- | --- | --- | --- | --- | --- | --- | --- | --- | --- | --- | --- | --- | --- |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=(u12+u13)/2
p1=(u13+u14)/2
p2=(u14+u15)/2
p3=(u15+u16)/2 q0=(d3+d4)/2
q1=(d4+d5)/2
q2=(d5+d6)/2
q3=(d6+d7)/2

F I G. 1 3

SLANT NUMBER 8

| | | | | | | | | | | | | | | | | | | | | | |
|---|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
| ESTIMATE PIXEL (LOWER) | | | | | | | | | | p0 | p1 | p2 | p3 | | | | | | | | | y=1

| | | | | | | | | | | | | | | | | | | | | | |
|---|---|---|---|---|---|---|---|---|---|---|---|---|---|---|---|---|---|---|---|---|---|
| ESTIMATE PIXEL (UPPER) | | | | | | | | | q0 | q1 | q2 | q3 | | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=u12  q0=d4
p1=u13  q1=d5
p2=u14  q2=d6
p3=u15  q3=d7

F I G. 1 4

SLANT NUMBER 9

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
|---|---|---|---|---|---|---|---|---|---|---|---|---|---|---|---|---|---|---|---|---|---|
| ESTIMATE PIXEL (LOWER) | | | | | | | | | | | | p0 | p1 | p2 | p3 | | | | | | | y=1

| ESTIMATE PIXEL (UPPER) | | | | | | | | | q0 | q1 | q2 | q3 | | | | | | | | | |
|---|---|---|---|---|---|---|---|---|---|---|---|---|---|---|---|---|---|---|---|---|---|
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=(u11+u12)/2         q0=(d4+d5)/2
p1=(u12+u13)/2         q1=(d5+d6)/2
p2=(u13+u14)/2         q2=(d6+d7)/2
p3=(u14+u15)/2         q3=(d7+d8)/2

F I G. 1 5

SLANT NUMBER 10

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
|---|---|---|---|---|---|---|---|---|---|---|---|---|---|---|---|---|---|---|---|---|---|
| ESTIMATE PIXEL (LOWER) | | | | | | | | | | | p0 | p1 | p2 | p3 | | | | | | | y=1 |

| ESTIMATE PIXEL (UPPER) | | | | | | | | | q0 | q1 | q2 | q3 | | | | | | | | | y=1 |
|---|---|---|---|---|---|---|---|---|---|---|---|---|---|---|---|---|---|---|---|---|---|
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=u11   q0=d5
p1=u12   q1=d6
p2=u13   q2=d7
p3=u14   q3=d8

F I G. 1 6

SLANT NUMBER 11

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
| ESTIMATE PIXEL (LOWER) | | | | | | | | | | | p0 | p1 | p2 | p3 | | | | | | | | y=1

| ESTIMATE PIXEL (UPPER) | | | | | | | | | q0 | q1 | q2 | q3 | | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=(u10+u11)/2          q0=(d5+d6)/2
p1=(u11+u12)/2          q1=(d6+d7)/2
p2=(u12+u13)/2          q2=(d7+d8)/2
p3=(u13+u14)/2          q3=(d8+d9)/2

F I G. 1 7

SLANT NUMBER 12

| | | | | | | | | | | | | | | | | | | | | | |
|---|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
| ESTIMATE PIXEL (LOWER) | | | | | | | | | | | p0 | p1 | p2 | p3 | | | | | | | | y=1

| | | | | | | | | | | | | | | | | | | | | | |
|---|---|---|---|---|---|---|---|---|---|---|---|---|---|---|---|---|---|---|---|---|---|
| ESTIMATE PIXEL (UPPER) | | | | | | | | | q0 | q1 | q2 | q3 | | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=u10         q0=d6
p1=u11         q1=d7
p2=u12         q2=d8
p3=u13         q3=d9

FIG. 18

SLANT NUMBER 13

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
| --- | --- | --- | --- | --- | --- | --- | --- | --- | --- | --- | --- | --- | --- | --- | --- | --- | --- | --- | --- | --- | --- |
| ESTIMATE PIXEL (LOWER) | | | | | | | | | p0 | p1 | p2 | p3 | | | | | | | | | | y=1

| ESTIMATE PIXEL (UPPER) | | | | | | | | q0 | q1 | q2 | q3 | | | | | | | | | | |
| --- | --- | --- | --- | --- | --- | --- | --- | --- | --- | --- | --- | --- | --- | --- | --- | --- | --- | --- | --- | --- | --- |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=(u9+u10)/2   q0=(d6+d7)/2
p1=(u10+u11)/2   q1=(d7+d8)/2
p2=(u11+u12)/2   q2=(d8+d9)/2
p3=(u12+u13)/2   q3=(d9+d10)/2

F I G. 1 9

SLANT NUMBER 14

| | | | | | | | | | | | | | | | | | | | | | |
|---|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
| ESTIMATE PIXEL (LOWER) | | | | | | | | | | p0 | p1 | p2 | p3 | | | | | | | | | y=1

| | | | | | | | | | | | | | | | | | | | | | |
|---|---|---|---|---|---|---|---|---|---|---|---|---|---|---|---|---|---|---|---|---|---|
| ESTIMATE PIXEL (UPPER) | | | | | | | | | q0 | q1 | q2 | q3 | | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=u9      q0=d7
p1=u10     q1=d8
p2=u11     q2=d9
p3=u12     q3=d10

F I G. 2 0

SLANT NUMBER 15

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
|---|---|---|---|---|---|---|---|---|---|---|---|---|---|---|---|---|---|---|---|---|---|
| ESTIMATE PIXEL (LOWER) | | | | | | | | | p0 | p1 | p2 | p3 | | | | | | | | | | y=1

| ESTIMATE PIXEL (UPPER) | | | | | | | | | q0 | q1 | q2 | q3 | | | | | | | | | |
|---|---|---|---|---|---|---|---|---|---|---|---|---|---|---|---|---|---|---|---|---|---|
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=(u8+u9)/2      q0=(d7+d8)/2
p1=(u9+u10)/2     q1=(d8+d9)/2
p2=(u10+u11)/2    q2=(d9+d10)/2
p3=(u11+u12)/2    q3=(d10+d11)/2

F I G. 2 1

SLANT NUMBER 16

| | | | | | | | | | | | | | | | | | | | | | |
|---|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 | y=0 |
| ESTIMATE PIXEL (LOWER) | | | | | | | | | p0 | p1 | p2 | p3 | | | | | | | | | | y=1

| | | | | | | | | | | | | | | | | | | | | | |
|---|---|---|---|---|---|---|---|---|---|---|---|---|---|---|---|---|---|---|---|---|---|
| ESTIMATE PIXEL (UPPER) | | | | | | | | | q0 | q1 | q2 | q3 | | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 | y=2 | p0=u8   q0=d8
p1=u9   q1=d9
p2=u10  q2=d10
p3=u11  q3=d11

F I G. 2 2

SLANT NUMBER 0

| | | | | | | | | | | | | | | | | | | | | |
|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
| INTERPOLATION PIXEL | | | | | | | | | | | (1) | (2) | (3) | (4) | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (u12+d4)/2
(2) = (u13+d5)/2
(3) = (u14+d6)/2
(4) = (u15+d7)/2

F I G. 2 3

SLANT NUMBER 1

| | | | | | | | | | | | | | | | | | | | | |
|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
| INTERPOLATION PIXEL | | | | | | | | | | | (1) | (2) | (3) | (4) | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (3*u12+u11+3*d4+d5)/8
(2) = (3*u13+u12+3*d5+d6)/8
(3) = (3*u14+u13+3*d6+d7)/8
(4) = (3*u15+u14+3*d7+d8)/8

F I G. 2 4

SLANT NUMBER 2

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
|---|---|---|---|---|---|---|---|---|---|---|---|---|---|---|---|---|---|---|---|---|
| INTERPOLATION PIXEL | | | | | | | | | (1) | (2) | (3) | (4) | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (u12+u11+d4+d5)/4
(2) = (u13+u12+d5+d6)/4
(3) = (u14+u13+d6+d7)/4
(4) = (u15+u14+d7+d8)/4

F I G. 2 5

SLANT NUMBER 3

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
|---|---|---|---|---|---|---|---|---|---|---|---|---|---|---|---|---|---|---|---|---|
| INTERPOLATION PIXEL | | | | | | | | | | (1) | (2) | (3) | (4) | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

SLANT NUMBER 4

| | | | | | | | | | | | | | | | | | | | | |
|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
| INTERPOLATION PIXEL | | | | | | | | | | | (1) | (2) | (3) | (4) | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (u11+d5)/2
(2) = (u12+d6)/2
(3) = (u13+d7)/2
(4) = (u14+d8)/2

F I G. 2 7

SLANT NUMBER 5

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
|---|---|---|---|---|---|---|---|---|---|---|---|---|---|---|---|---|---|---|---|---|
| INTERPOLATION PIXEL | | | | | | | | | | | (1) | (2) | (3) | (4) | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

SLANT NUMBER 6

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
|---|---|---|---|---|---|---|---|---|---|---|---|---|---|---|---|---|---|---|---|---|
| INTERPOLATION PIXEL | | | | | | | | | (1) | (2) | (3) | (4) | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (u11+u10+d5+d6)/4
(2) = (u12+u11+d6+d7)/4
(3) = (u13+u12+d7+d8)/4
(4) = (u14+u13+d8+d9)/4

F I G. 2 9

SLANT NUMBER 7

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
|---|---|---|---|---|---|---|---|---|---|---|---|---|---|---|---|---|---|---|---|---|
| INTERPOLATION PIXEL | | | | | | | | | (1) | (2) | (3) | (4) | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (u11+3*u10+d5+3*d6)/8
(2) = (u12+3*u11+d6+3*d7)/8
(3) = (u13+3*u12+d7+3*d8)/8
(4) = (u14+3*u13+d8+3*d9)/8

F I G. 3 0

SLANT NUMBER 8

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
|---|---|---|---|---|---|---|---|---|---|---|---|---|---|---|---|---|---|---|---|---|
| INTERPOLATION PIXEL | | | | | | | | | | (1) | (2) | (3) | (4) | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (u10+d6)/2
(2) = (u11+d7)/2
(3) = (u12+d8)/2
(4) = (u13+d9)/2

F I G. 3 1

SLANT NUMBER 9

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
|---|---|---|---|---|---|---|---|---|---|---|---|---|---|---|---|---|---|---|---|---|
| INTERPOLATION PIXEL | | | | | | | | | | (1) | (2) | (3) | (4) | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = $(3*u10+u9+3*d6+d7)/8$
(2) = $(3*u11+u10+3*d7+d8)/8$
(3) = $(3*u12+u11+3*d8+d9)/8$
(4) = $(3*u13+u12+3*d9+d10)/8$

F I G. 3 2

SLANT NUMBER 10

| | | | | | | | | | | | | | | | | | | | | |
|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
| INTERPOLATION PIXEL | | | | | | | | | | (1) | (2) | (3) | (4) | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (u10+u9+d6+d7)/4
(2) = (u11+u10+d7+d8)/4
(3) = (u12+u11+d8+d9)/4
(4) = (u13+u12+d9+d10)/4

F I G. 3 3

SLANT NUMBER 11

| | | | | | | | | | | | | | | | | | | | | |
|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
| INTERPOLATION PIXEL | | | | | | | | | (1) | (2) | (3) | (4) | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (u10+3*u9+d6+3*d7)/8
(2) = (u11+3*u10+d7+3*d8)/8
(3) = (u12+3*u11+d8+3*d9)/8
(4) = (u13+3*u12+d9+3*d10)/8

F I G. 3 4

SLANT NUMBER 12

| | | | | | | | | | | | | | | | | | | | | |
|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
| INTERPOLATION PIXEL | | | | | | | | | | (1) | (2) | (3) | (4) | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (u9+d7)/2
(2) = (u10+d8)/2
(3) = (u11+d9)/2
(4) = (u12+d10)/2

F I G. 3 5

SLANT NUMBER 13

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
|---|---|---|---|---|---|---|---|---|---|---|---|---|---|---|---|---|---|---|---|---|
| INTERPOLATION PIXEL | | | | | | | | | | (1) | (2) | (3) | (4) | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (3*u9+u8+3*d7+d8)/8
(2) = (3*u10+u9+3*d8+d9)/8
(3) = (3*u11+u10+3*d9+d10)/8
(4) = (3*u12+u11+3*d10+d11)/8

F I G. 36

SLANT NUMBER 14

| | | | | | | | | | | | | | | | | | | | | |
|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
| INTERPOLATION PIXEL | | | | | | | | | (1) | (2) | (3) | (4) | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (u9+u8+d7+d8)/4
(2) = (u10+u9+d8+d9)/4
(3) = (u11+u10+d9+d10)/4
(4) = (u12+u11+d10+d11)/4

F I G. 3 7

SLANT NUMBER 15

| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
|---|---|---|---|---|---|---|---|---|---|---|---|---|---|---|---|---|---|---|---|---|
| INTERPOLATION PIXEL | | | | | | | | | (1) | (2) | (3) | (4) | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (u9+3*u8+d7+3*d8)/8
(2) = (u10+3*u9+d8+3*d9)/8
(3) = (u11+3*u10+d9+3*d10)/8
(4) = (u12+3*u11+d10+3*d11)/8

F I G. 3 8

SLANT NUMBER 16

| | | | | | | | | | | | | | | | | | | | | |
|---|---|---|---|---|---|---|---|---|---|---|---|---|---|---|---|---|---|---|---|---|
| ACTUAL PIXEL (UPPER) | u0 | u1 | u2 | u3 | u4 | u5 | u6 | u7 | u8 | u9 | u10 | u11 | u12 | u13 | u14 | u15 | u16 | u17 | u18 | u19 |
| INTERPOLATION PIXEL | | | | | | | | | (1) | (2) | (3) | (4) | | | | | | | | |
| ACTUAL PIXEL (LOWER) | d0 | d1 | d2 | d3 | d4 | d5 | d6 | d7 | d8 | d9 | d10 | d11 | d12 | d13 | d14 | d15 | d16 | d17 | d18 | d19 |

(1) = (u8+d8)/2
(2) = (u9+d9)/2
(3) = (u10+d10)/2
(4) = (u11+d11)/2

F I G. 3 9

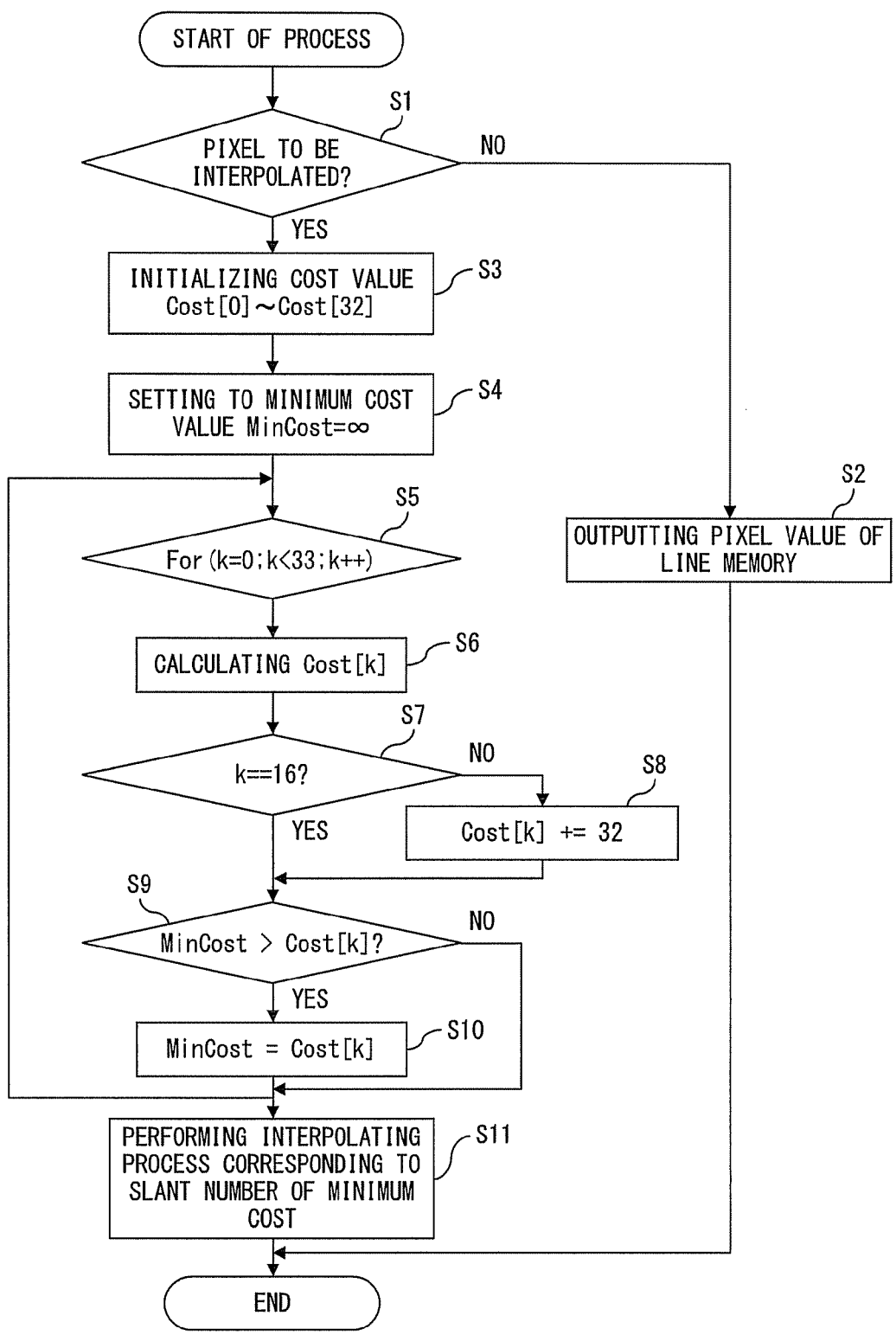
F I G. 4 0

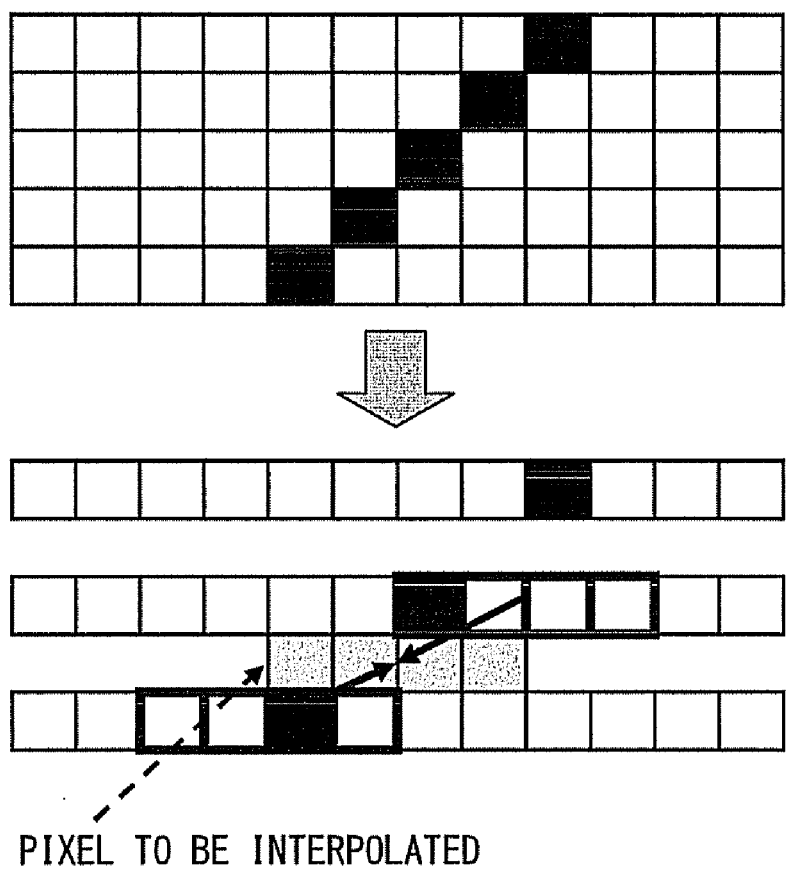
PIXEL TO BE INTERPOLATED
F I G. 4 3

IMAGE CONVERSION DEVICE AND METHOD FOR CONVERTING A FIELD IMAGE INTO A FRAME IMAGE

CROSS-REFERENCE TO RELATED APPLICATION

This application is a continuation of PCT Application No. PCT/JP2007/000236, filed on Mar. 16, 2007, the entire contents of which are incorporated herein by reference.

FIELD

The present application relates to an image conversion system, for example, an image conversion device and an image converting method for generating a progressive scan frame image from the interlaced image in the top field or the bottom field.

BACKGROUND

In the image display device in the interlace scanning, for example, the top field image configured by the odd-numbered scanning line and the bottom field image configured by the even-numbered scanning line in the image of one frame are continuously displayed, and are viewed by a person as one image.

Thus, when a composite frame image is just generated from two interlaced field images, there occurs no problem if the images are still images. However, if the images are moving images, the time-lag between the two fields causes the problem of shifted images as afterimages, blurred images, etc. in one composite frame image.

Therefore, in the case of moving images, the field image of one of the top field and the bottom field is generally used in generating a frame image. In this case, it is necessary to obtain by interpolating the data of pixels on every second line in the field image.

Figure 1:
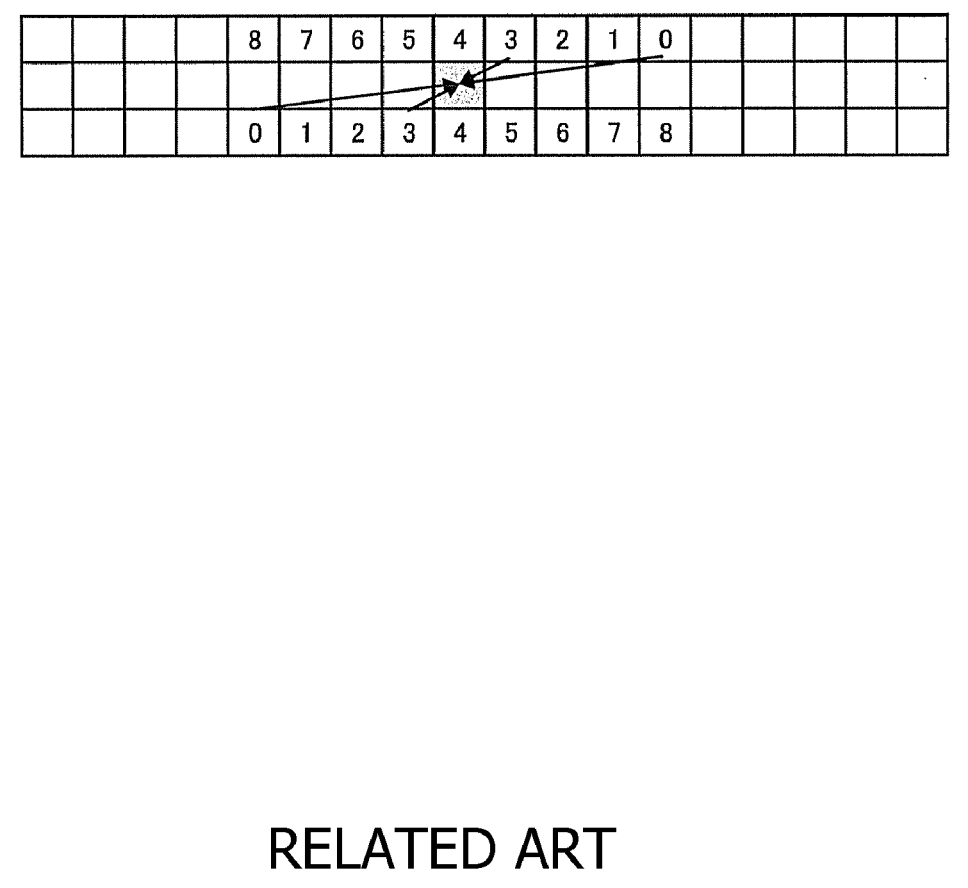

FIGS. 1 and 2 are explanatory views of prior art of the method of interpolating the pixel data on every second line in the field image. In FIG. 1, the first and third lines actually have pixels, and the pixel value of the pixel on the second line is interpolated using the pixel values of the pixels on the first and third lines. In the interpolating process, the interpolation value of the central pixel on the interpolation line, that is, the pixel to be interpolated between the pixel of the number 4 on the upper line and the pixel of the number 4 on the lower line, is obtained using the intensity of the pixels of the numbers 0 through 8 on the upper line and the intensity of the pixels of the numbers 0 through 8 on the lower line.

FIG. 2 illustrates examples of the intensity values of actual pixels on the upper and lower lines. Using the intensity values, the absolute value of the difference between the intensity values of the pixels having the similar numbers between the upper and lower lines is obtained. And the average value of the intensity values of the pixels on the upper and lower lines corresponding to the numbers minimizing the absolute value of the difference is defined as the intensity value of the pixel to be interpolated. In FIG. 2, the number minimizing the absolute value of the difference between the intensity values of the pixels on the upper and lower lines is 0. The numbers 0 through 8 indicates the slant of the line connecting the pixel to be interpolated and the pixels of the upper and lower lines of each number. Then, using the slanting line of number 0, the average value of the pixel values of the two pixels of the number, that is, 16, is obtained as the intensity value of the pixel to be interpolated.

FIG. 3 is an explanatory view of the problem of the prior art described above with reference to FIGS. 1 and 2. As illustrated above in FIG. 3, when there is a thin slanting line in one frame image, it may be necessary to interpolate, for example, the data of the pixel on the even-numbered line from the data of the pixel on the odd-numbered line.

As illustrated below in FIG. 3, for example, when the pixel between the pixels of the number 2 on the third and fifth lines is to be interpolated, the absolute values of the differences of the pixel values corresponding to the numbers of the slanting lines are all the same, for example, and the number of the slanting line for the pixel to be interpolated cannot be determined.

Thus, the technology of the prior art of the image conversion system for generating a frame image from a field image is described in the patent document 1. In the patent document 1, the sharpness levels in the even number field and the odd number field are calculated, the interpolating process is performed on the basis of afield at higher sharpness level, the interpolating process is performed on the basis of the even number field, and the interpolating process is performed on the basis of the odd number field depending on the magnitude collation between the absolute value of the difference between the two sharpness levels and the threshold. Then, the intensity values of the interpolation pixels are obtained, and the intensity values are combined and a frame image is generated, thereby generating a high-quality frame image.

Patent Document 1: Japanese Laid-open Patent Publication No. 2004-274361 "Interpolating Method, Interpolating Program, and Record Medium recording the same, for example, and Image Processing Device and Image Forming Device provided with the same, for example".

However, since the technology of the patent document 1 uses a normal linear interpolation system, the problem described with reference to FIG. 3 does not occur, but the problem of unsmooth jaggy occurs instead. After all, the technology cannot solve the problem that the interpolation on the thin slanting line as described with reference to FIG. 3 cannot be appropriately performed.

SUMMARY

According to an aspect of the embodiment, an image conversion device includes a pixel value estimate unit configured to obtain a plurality of first estimate pixel values in a third line, which is between a first line and a second line, from a plurality of pixel values in the first line, and to obtain a plurality of second estimate pixel values in the third line from a plurality of pixel values in the second line, a combination search unit configured to search for a combination of the first and second estimate pixel values minimizing a first calculation value calculated on a basis of a first difference value between the second estimate pixel value and a predetermined pixel value in the first line and a second difference value between the first estimate pixel value and a predetermined pixel value in the second line, and a pixel interpolation unit configured to calculate a pixel value of the pixel to be interpolated from the pixel values of the first and second lines corresponding to the combination of the first and second estimate values minimizing the first calculation value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is an explanatory view (1) of prior art of the pixel interpolation system;

FIG. 2 is an explanatory view (2) of prior art of the pixel interpolation system;

FIG. 4 is a block diagram illustrating the configuration according to the principle of the image conversion device of the present invention;

FIG. 6 is an explanatory view of obtaining an estimate pixel value corresponding to the slant number 0;

FIG. 7 is an explanatory view of obtaining an estimate pixel value corresponding to the slant number 1;

FIG. 8 is an explanatory view of obtaining an estimate pixel value corresponding to the slant number 2;

FIG. 9 is an explanatory view of obtaining an estimate pixel value corresponding to the slant number 3;

FIG. 10 is an explanatory view of obtaining an estimate pixel value corresponding to the slant number 4;

FIG. 11 is an explanatory view of obtaining an estimate pixel value corresponding to the slant number 5;

FIG. 12 is an explanatory view of obtaining an estimate pixel value corresponding to the slant number 6;

FIG. 13 is an explanatory view of obtaining an estimate pixel value corresponding to the slant number 7;

FIG. 14 is an explanatory view of obtaining an estimate pixel value corresponding to the slant number 8;

FIG. 15 is an explanatory view of obtaining an estimate pixel value corresponding to the slant number 9;

FIG. 16 is an explanatory view of obtaining an estimate pixel value corresponding to the slant number 10;

FIG. 17 is an explanatory view of obtaining an estimate pixel value corresponding to the slant number 11;

FIG. 18 is an explanatory view of obtaining an estimate pixel value corresponding to the slant number 12;

FIG. 19 is an explanatory view of obtaining an estimate pixel value corresponding to the slant number 13;

FIG. 20 is an explanatory view of obtaining an estimate pixel value corresponding to the slant number 14;

FIG. 21 is an explanatory view of obtaining an estimate pixel value corresponding to the slant number 15;

FIG. 22 is an explanatory view of obtaining an estimate pixel value corresponding to the slant number 16;

FIG. 23 is an explanatory view of the pixel interpolating method corresponding to the slant number 0;

FIG. 24 is an explanatory view of the pixel interpolating method corresponding to the slant number 1;

FIG. 25 is an explanatory view of the pixel interpolating method corresponding to the slant number 2;

FIG. 26 is an explanatory view of the pixel interpolating method corresponding to the slant number 3;

FIG. 27 is an explanatory view of the pixel interpolating method corresponding to the slant number 4;

FIG. 28 is an explanatory view of the pixel interpolating method corresponding to the slant number 5;

FIG. 29 is an explanatory view of the pixel interpolating method corresponding to the slant number 6;

FIG. 30 is an explanatory view of the pixel interpolating method corresponding to the slant number 7;

FIG. 31 is an explanatory view of the pixel interpolating method corresponding to the slant number 8;

FIG. 32 is an explanatory view of the pixel interpolating method corresponding to the slant number 9;

FIG. 33 is an explanatory view of the pixel interpolating method corresponding to the slant number 10;

FIG. 34 is an explanatory view of the pixel interpolating method corresponding to the slant number 11;

FIG. 35 is an explanatory view of the pixel interpolating method corresponding to the slant number 12;

FIG. 36 is an explanatory view of the pixel interpolating method corresponding to the slant number 13;

FIG. 37 is an explanatory view of the pixel interpolating method corresponding to the slant number 14;

FIG. 38 is an explanatory view of the pixel interpolating method corresponding to the slant number 15;

FIG. 39 is an explanatory view of the pixel interpolating method corresponding to the slant number 16;

FIG. 40 is a process flowchart of the image converting method;

FIG. 43 is an explanatory view of the effect of the embodiment.

DESCRIPTION OF EMBODIMENTS

Figure 3:
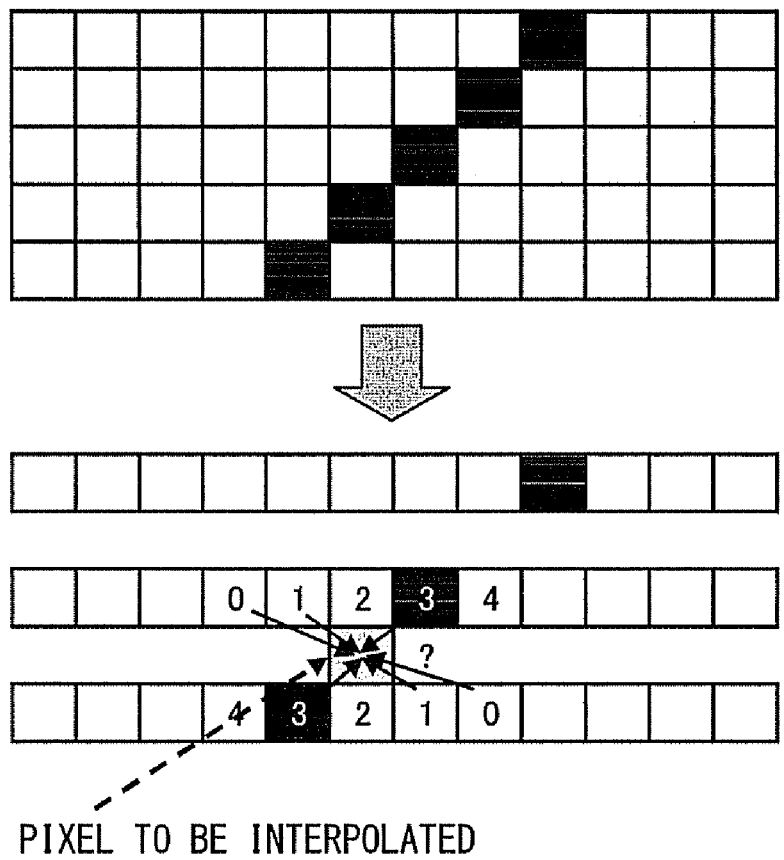
FIG. 3 is an explanatory view of the problem with the prior art in the pixel interpolation system.

FIG. 4 is a block diagram illustrating the configuration according to the principle of the image conversion device of the embodiment. In FIG. 4, an image conversion device 1 converts an image of, for example, the top or bottom field into a frame image, and includes a pixel value estimate unit 2, a combination search unit 3, a pixel interpolation unit 4, and a selector 5.

The pixel value estimate unit 2 calculates an estimate pixel value for comparison with a lower line using an upper line pixel value, and an estimate pixel value for comparison with an upper line using a lower line pixel value corresponding to a plurality of consecutive pixels to be interpolated in a line between the upper and the lower lines adjacent in a field image. As described later, the pixel value estimate unit 2 obtains estimate pixel values for comparison with the lower and upper lines corresponding to the slant numbers of a plurality of directions connecting a pixel to be interpolated to one or more pixels on the upper or lower line to be used in obtaining the pixel value of each pixel to be interpolated.

The combination search unit 3 searches for a slant number of the direction minimizing a sum of the absolute value of the difference between the actual upper line pixel value and the estimate pixel value for comparison with the upper line obtained by the pixel value estimate unit 2 and the absolute value of the difference between the actual lower line pixel value and the estimate pixel value for comparison with the lower line, corresponding to a plurality of pixels to be interpolated. The pixel interpolation unit 4 obtains interpolation values for a plurality of pixels to be interpolated corresponding to the minimizing slant number. The selector 5 selects the data of an input field image for a line actually containing pixel data in the field image, and selects an interpolation result by the pixel interpolation unit 4 for a line to be interpolated.

Figure 5:
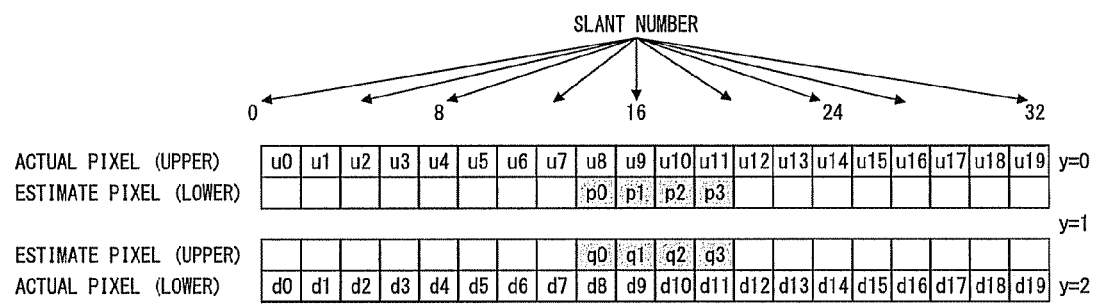
FIG. 5 is an explanatory view of the slant number in calculating an estimate pixel value.

FIG. 5 is an explanatory view of the slant number in calculating an estimate pixel value according to the present embodiment. In FIG. 5, the line of the pixels having the pixel values of u0 through u19 refers to an upper line in the field image, and the line of the pixels having the pixel values of d0 through d19 refers to a lower line in the field image. That is, if the line number in the frame image is y=0 for the top line, and y=2 for the bottom line, then it may be necessary to obtain the pixel value of the pixel of the line number y=1 by interpolation.

In the present embodiment, it is assumed that the four consecutive pixels on the line to be interpolated is one block, and pixels are interpolated by the block. For example, the pixel values of four pixels are decided to be obtained by interpolation by setting each block of four consecutive pixels of the field image starting with the leftmost pixel.

In FIG. 5, the central white portion corresponds to the line to be interpolated, and the four pixels enclosed by the pixel values p0 through p3 on the second line and the pixel values q0 through q3 on the fourth line are assumed to be pixels to be interpolated.

The pixel values p0 through p3 on the second line are estimate pixel values obtained corresponding to the respective slant numbers from the actual pixels on the line of line number y=0, that is, the pixels having the pixel values u0 through u19. By contrast, the pixel values q0 through q3 on the fourth line are estimate pixel values obtained from the pixel values of the pixels corresponding to the line numbers in the pixel values d0 through d19 of the pixels on the line of the line number y=2. The estimate pixels in FIG. 5 are not actual pixels, but are obviously virtual pixels.

In the present embodiment, 33 (0 through 32) slant numbers are prepared for use in estimation of pixel values and for use in interpolation, and an estimate pixel value is first obtained corresponding to each slant number.

FIGS. 6 through 22 are explanatory views of obtaining an estimate pixel value corresponding to the respective slant numbers. First, FIG. 6 is an explanatory view of obtaining an estimate pixel value corresponding to the slant number 0. The pixel values u16 through u19 on the actual pixel values on the upper line (y=0) are used directly as the estimate pixel values p0 through p3 for the lower line. The pixel values d0 through d3 on the actual lower line (y=2) are used directly as the estimate pixel values q0 through q3 for the upper line.

FIG. 7 is an explanatory view of obtaining an estimate pixel value corresponding to the slant number 1. In FIG. 7, of the estimate pixel values for the lower line, the value p0 is obtained as an average value of the pixel values u15 and u16 of the actual pixels on the upper line, the value p1 is obtained as an average value of the values u16 and u17, the value p2 is obtained as an average value of the values u17 and u18, and the value p3 is obtained as an average value of the values u18 and u19. The estimate pixel values for the upper line are also obtained as average values of the two pixel values in the actual pixel values on the lower line.

FIG. 8 is an explanatory view of obtaining an estimate pixel value corresponding to the slant number 2. As compared with FIG. 6 for the slant number 0, each estimate pixel value is obtained as a pixel value of the pixel obtained by one column moving the actual pixel on each of the upper and lower lines.

FIG. 9 is an explanatory view of obtaining an estimate pixel value corresponding to the slant number 3. As compared with FIG. 7 for the slant number 1, the two pixels to be averaged are similarly moved by one column, and the pixel values of the two pixels as a movement result are averaged, thereby obtaining an estimate pixel value.

Afterwards, in the method of obtaining the estimate pixel value corresponding to the slant number 4 in FIG. 10 through the method of obtaining the estimate pixel value corresponding to the slant number 15 in FIG. 21, the actual pixels on the upper and lower lines for use in estimating pixel values are moved toward the center by a half column, the estimate is performed using the pixel value of one pixel for an even slant number, and using an average value of the pixel values of two consecutive pixels for an odd slant number.

FIG. 22 is an explanatory view of the pixel value estimating method corresponding to the slant number 16 of the slanting line perpendicular to the direction of the lines. As the estimate pixel values p0 through p3 for the lower line, the pixel values u8 through u11 directly above the lower line are used as is. Similarly, as the estimate pixel values q0 through q3 for the upper line, the actual pixel values d8 through d11 on the lower line are used as is.

In the method of obtaining the estimate pixel values corresponding to the slant numbers 17 through 32, the slant is inverse to those in FIGS. 21 through 6, and the estimate pixel values are similarly obtained as in FIGS. 21 through 6 using the slant from the upper left to the lower right.

Using the estimate pixel value corresponding to each slant number obtained above, a sum of the absolute value of the difference between the estimate pixel value for the upper line and the actual upper line pixel value and the absolute value of the difference between the estimate pixel value for the lower line and the actual lower line pixel value is obtained by the following equation.

$$\text{Sum of Absolute Values} = |p0-d8|+|p1-d9|+|p2-d10|+ \\ |p3-d11|+|q0-u8|+|q0-u8|+|q1-u9|+|q2-u10|+ \\ |q3-u11| \qquad (1)$$

In the present embodiment, the slant number minimizing the sum of the absolute values of the differences is determined between the slant numbers 0 through 32, but with a view to preventing the noise occurring in the frame image, a predetermined value a, for example, 32, is to be added to the result other than the slant number 16 so that the vertical direction, that is, the slant number 16, can be more probably selected as an estimate direction. Otherwise, it can be considered that an addition value can be smaller than 32 and added to the slant numbers close to the vertical direction, for example, 15 and 17.

When the slant number minimizing the sum of the absolute values of the differences is determined including he addition value α, one block on the interpolation line, that is, four pixels, are interpolated corresponding to the slant number.

FIGS. 23 through 39 are explanatory views of the pixel interpolating method corresponding to the slant numbers 0 through 16. In these figures, the interpolation is performed on the four pixels having the pixel values (1) through (4) in one block on the interpolation line. The pixel values of the pixels obtained by the interpolation are represented by the following common equation.

$$\{A*p(a,y)+B*p(b,y)+A*p(c,y+2)+B*p(d,y+2)\}/C \qquad (2)$$

That is, the interpolation value of a pixel is calculated using one or two of the pixel values p (a, y) and p (b, y) of the two consecutive pixels on the upper line, and using one or two of the pixel values p (c, y+2) and p (d, y+2) of the two consecutive pixels on the lower line. As the coefficients A, B, and C for use in the calculation can be: A=1, B=0, and C=2 are used for the slant numbers 0, 4, 8, 12, and 16; A=3, B=1, and C=8 are used for the slant numbers 1, 5, 9, and 13; A=B=1, and C=4 are used for the slant numbers 2, 6, 10, and 14; and A=1, B=3, and C=8 are used for the slant numbers 3, 7, 11, and 15, thereby calculating the interpolation values.

FIG. 40 is a process flowchart of the image converting method according to the present embodiment. In FIG. 40, when the process is started, it is first determined in step S1 whether or not the currently regarded pixel is a pixel to be interpolated. If the pixel is on the actually existing line in the field image, then the pixel is not a pixel to be interpolated, the pixel value of the line memory is output in step S2, and the process terminates.

If the pixel is a pixel to be interpolated, then the cost values corresponding to the slant numbers 0 through 32 for the calculation of estimate pixel values are initialized to 0 in step S3, the value of the minimum cost value MinCost in the corresponding costs to the line numbers 0 through 32 is set to the infinite in step S4, and then the loop process in performed in steps S5 through S10.

In the loop in steps S5 through S10, the slant number k corresponding to the MinCost as the minimum value in the costs corresponding to the slant numbers 0 through 32 is detected. That is, first in step S5, the value of k is set to "0", the cost corresponding to the slant number 0 is calculated in step S6, and it is determined in step S7 whether or not the value of k is equal to "16". Since it is not equal to 16, "32" is added to the value of the cost calculated in step S6, it is determined in step S9 whether or not the value of the cost corresponding to k=0 is less than the minimum cost value MinCost. Since it is less than the minimum cost, the value of the cost corresponding to the slant number 0 is assigned to MinCost, thereby returning control to the process in step S5.

The value of the slant number k is incremented in step S5, and the processes in steps S6 through S10 are repeated. The processes are repeated until the value of k becomes less than 33, that is, reaches 32. In the processes, "32" is not added to the cost calculated in step S6 only when the slant number k=16, and control is passed from step S7 to step S9. Then, the smallest value of the cost in the slant number 0 through 32 is assigned to MinCost, thereby obtaining the slant number k corresponding to the minimum cost value. Then, in step S11, the interpolating process is performed corresponding to the slant number of the minimum cost, thereby terminating the process.

Figure 41:
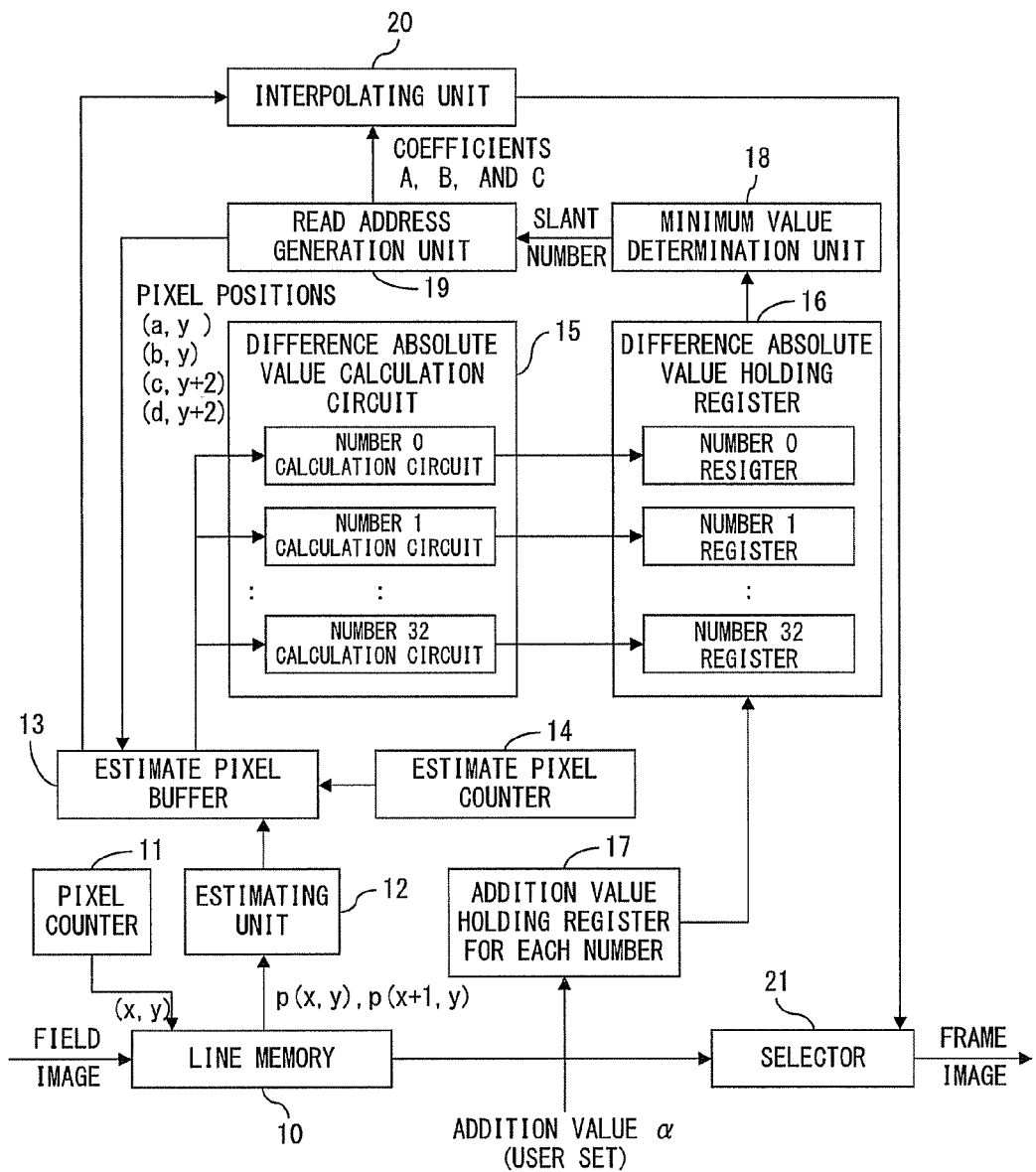
FIG. 41 is a block diagram of the configuration of the image conversion device.

FIG. 41 is a block diagram of the configuration of the image conversion device according to the present embodiment. In FIG. 41, the image conversion device includes: line memory 10 for storing image data of, for example, two lines in the field image; a pixel counter 11 for counting a read pixel from the line memory 10; an estimating unit 12 for calculating an estimate pixel value using the pixel value of a pixel read from the line memory 10 at the specification of the pixel counter 11; an estimate pixel buffer 13 for storing an estimate pixel value output by the estimating unit 12 and the actual pixel values u8 through u11 and d8 through d11 on the upper and lower lines; an estimate pixel counter 14 for counting a read pixel value from the estimate pixel buffer 13; a difference absolute value calculation circuit 15 having 33 calculation circuits calculating each sum of the difference absolute values provided by the equation (1) corresponding to each slant number using the pixel value specified by the estimate pixel counter 14 and read from the estimate pixel buffer 13; a difference absolute value holding register 16 configured by 33 registers for storing calculation results of the 33 internal calculation circuits in the difference absolute value calculation circuit 15; an addition value holding register 17 for each number for holding the addition value (user set value) $\alpha$ to be added to the number other than, for example, the slant number 16, and assigning the addition value to the difference absolute value holding register 16; a minimum value determination unit 18 for obtaining a slant number corresponding to a sum of the difference absolute values smallest in each slant number using the result of adding the addition value to the sum of the difference absolute values corresponding to the respective slant numbers in the difference absolute value holding register 16; a read address generation unit 19 for generating a read address for reading a pixel value of a necessary pixel from the estimate pixel buffer 13 to interpolate one block diagram, that is, four pixels, corresponding to the slant number determined by the minimum value determination unit 18; an interpolating unit 20 for obtaining the pixel values of the four pixels in one block diagram by interpolation using the pixel value of the pixel read corresponding to the read address; and a selector 21 for directly selecting the image data from the line memory 10 when the line input to the line memory 10 in the field image is the actual pixel line existing in the field image, selecting the output from the interpolating unit 20 when the input line is a line to be interpolated, and outputting the selected data as a frame image.

In FIG. 41, the necessary pixel value of the actual pixel in the line to obtain the estimate pixel values q0 through q3 for the upper line and the estimate pixel values p0 through p3 for the lower line described above with reference to FIG. 5 corresponding to a slant number is provided for the estimating unit 12 from the line memory 10 at the specification of the pixel counter 11. There is one or two necessary pixel values. If there are two of them, two horizontally consecutive pixel values are provided for the estimating unit 12. The estimating unit 12 outputs an average value of the two pixels or the pixel value of one pixel to the estimate pixel buffer 13.

It is assumed that the estimate pixel buffer 13 stores not only estimate pixel values, u8 through u11, and q8 through q11, but also the pixel values of the pixels used for the interpolation by the interpolating unit 20 at the addresses easily accessible by the interpolating unit 20.

The estimate pixel counter 14 counts the estimate pixel values etc. used to calculate a sum of the difference absolute values in the respective calculation circuits corresponding to the slant numbers 0 through 32 in the difference absolute value calculation circuit 15, and the estimate pixel values etc. are supplied from the estimate pixel buffer 13 to each calculation circuit. Then, a sum of the difference absolute values for the respective slant numbers is calculated, and a result is stored in the 33 registers in the difference absolute value holding register 16. As necessary, an addition value $\alpha$ is added to the values in the registers, and the minimum value determination unit 18 determines the slant number minimizing the sum of difference absolute values corresponding to the addition result.

The read address generation unit 19 provides the interpolating unit 20 with the values of the coefficients A, B, and C determined by the slant number as described above, generates the position of the pixel used to perform calculation in the interpolating process as a read address. The necessary pixel value of a pixel is provided from the estimate pixel buffer 13 to the interpolating unit 20, and the pixel value for the interpolation pixel is calculated by the equation (2) above.

The pixel value estimate unit according to claim 1 of the embodiment corresponds to the estimating unit 12 in FIG. 41, and the combination search unit corresponds to the minimum value determination unit 18 in a narrow concept, but the combination search unit includes the difference absolute value calculation circuit 15 and the difference absolute value holding register 16 in a broad concept. And the pixel interpolation unit corresponds to the interpolating unit 20.

The pixel to be interpolated according to claim 1 corresponds to, for example, the pixel values (1) through (4) in FIG. 23, and the estimate pixel value corresponds to the pixel values p0 through p3, and q0 through q3 in FIG. 5.

Figure 42:
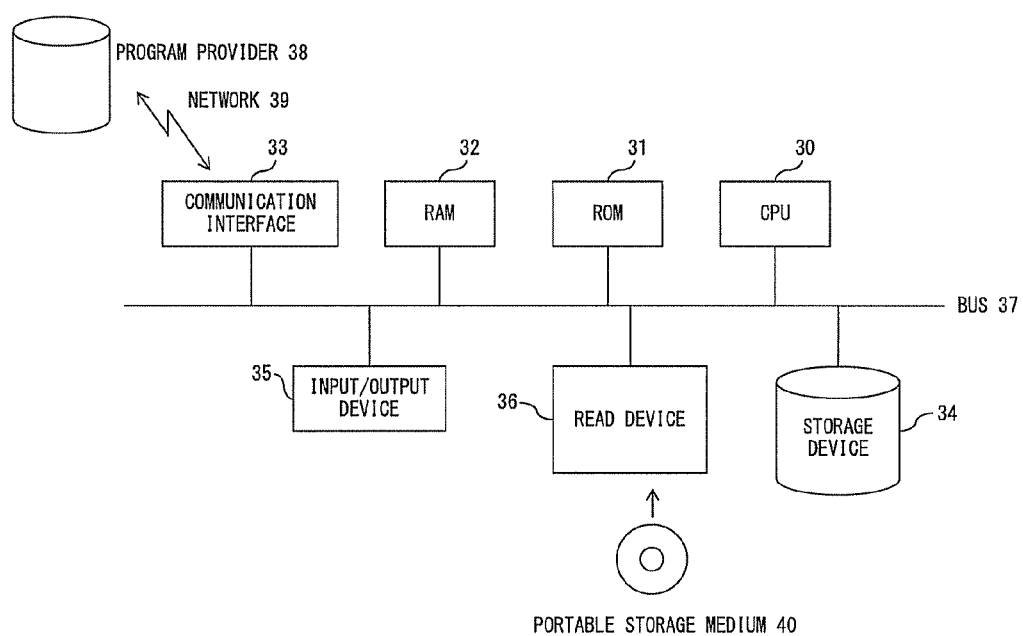
FIG. 42 is an explanatory view of loading a program for realizing the embodiment into a computer.

The image conversion device and converting method of the embodiment are described above in detail, and the image conversion device may be configured on the basis of a common computer system. FIG. 42 is a block diagram of the configuration of the computer system, that is, the hardware environment.

In FIG. 42, the computer system is configured by a central processing unit (CPU) 30, read-only memory (ROM) 31, random-access memory (RAM) 32, a communication interface 33, a storage device 34, an input/output device 35, a read device 36 of a portable storage medium, and a bus 37 through which all of the components are connected.

The storage device 34 may be a storage device in various forms such as a hard disk, a magnetic disk, etc., and the storage device 34 or the RO 31 stores a program described in the flowchart in FIG. 40, a program for calculating an estimate pixel value corresponding to each slant number and an interpolation pixel value, a program according to claim 7 of the embodiment, etc. By executing the programs by the CPU 30, an estimate pixel value, an interpolation pixel value, etc. according to the present embodiment may be calculated.

The program may be stored in, for example, the storage device 34 through a network 39 and the communication interface 33 by a program provider 38, may be marketed and stored in a generally distributed portable storage medium 40, set in the read device 36, and executed by the CPU 30. The portable storage medium 40 may be a storage medium in various forms such as CD-ROM, a flexible disk, an optical disk, a magneto optical disk, a DVD, etc., and the read device 36 reads the program stored in the storage medium, thereby converting a field image according to the present embodiment into a frame image.

FIG. 43 is an explanatory view of the effect of the embodiment. FIG. 43 is an explanatory view corresponding to the problem with the prior art illustrated in FIG. 3. Instead of the detection of a slant using one pixel to be interpolated when there is a thin slanting line in a frame image, a plurality of pixels, for example, four consecutive pixels are observed as target pixels for detection of a slant according to the embodiment. Therefore, a pixel in an interpolation line may be appropriately interpolated without mistakenly detecting a slanting line.

According to any one of aforementioned embodiment, mistakenly detecting a thin slanting line, and noise from being generated on a frame image by the mistaken detection may be prevented.

According to any one of aforementioned embodiment, an estimate pixel value is obtained using a plurality of consecutive pixels on a line to be interpolated, for example, four pixels as a block, and a pixel value is interpolated corresponding to the combination of estimate pixel values minimizing a sum of absolute values of the differences between the actual image pixel values and the estimate pixel values. Thus, mistaken detection of a thin slanting line may be avoided, and the noise occurring on the frame image may be suppressed.

The methods of calculating an estimate pixel value and interpolating a pixel value described above are only examples, and it is obvious that the image conversion system according to the present invention is not limited to these methods.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An image conversion device comprising:
   a pixel value estimate unit configured to obtain a plurality of first estimate pixel values in a third line, which is between a first line and a second line, from a plurality of pixel values in the first line, and to obtain a plurality of second estimate pixel values in the third line from a plurality of pixel values in the second line;
   a combination search unit configured to search for a combination of the first and second estimate pixel values minimizing a first calculation value calculated on a basis of a first difference value between the second estimate pixel value and a predetermined pixel value in the first line and a second difference value between the first estimate pixel value and a predetermined pixel value in the second line; and
   a pixel interpolation unit configured to calculate a pixel value of the pixel to be interpolated from the pixel values of the first and second lines corresponding to the combination of the first and second estimate values minimizing the first calculation value.

2. The image conversion device according to claim 1, wherein
   the combination search unit searches for a combination minimizing a result of adding to the first calculation value a predetermined positive constant for all combinations except a combination for which the first estimate pixel value is calculated from the pixel value of the pixel in the first line perpendicular to the pixel to be interpolated and the line in the field and the second estimate pixel value is calculated from the pixel value of the pixel in the second line perpendicular to the pixel to be interpolated and the line in the field.

3. The image conversion device according to claim 1, wherein
   the pixel value estimate unit defines each of the plurality of first estimate pixel values as one pixel value or an average of two pixel values of the plurality of pixel values of the first line, and defines each of the plurality of second estimate pixel values as one pixel value or an average of two pixel values of the plurality of pixel values of the second line.

4. An image converting method comprising:
   calculating a plurality of first estimate pixel values in the third line, which is between a first line and a second line, from a plurality of pixel values in the first line;
   calculating a plurality of second estimate pixel values in the third line from a plurality of pixel values in the second line;
   calculating a first calculation value on a basis of a first difference value between the second estimate pixel value and a first pixel value in the first line and a second difference value between the first estimate pixel value and a second pixel value in the second line;
   searching for a combination of the first and second estimate pixel values minimizing the first calculation value; and
   calculating, by a processor, an interpolation pixel value from the pixel values of the first and second lines corresponding to the combination of the first and second estimate values minimizing the first calculation value.

5. The image converting method according to claim 4, wherein
   a search is made for a combination minimizing a result of adding to the first calculation value a predetermined positive constant for all combinations except a combination for which the first estimate pixel value is calculated from the pixel value of the pixel in the first line perpendicular to the pixel to be interpolated and the line in the field and the second estimate pixel value is calculated from the pixel value of the pixel in the second line perpendicular to the pixel to be interpolated and the line in the field.

6. The image converting method according to claim 4, wherein each of the plurality of first estimate pixel values is defined as one pixel value or an average of two of the plurality of pixel values of the first line, and each of the plurality of second estimate pixel values is defined as one pixel value or an average of two of the plurality of pixel values of the second line.

7. A non-transitory computer-readable portable storage medium adapted to store a program, the program causes a computer to execute:

calculating a plurality of first estimate pixel values in the third line, which is between a first line and a second line, from a plurality of pixel values in the first line;

calculating a plurality of second estimate pixel values in the third line from a plurality of pixel values in the second line;

calculating a first calculation value on a basis of a first difference value between the second estimate pixel value and a first pixel value in the first line and a second difference value between the first estimate pixel value and a second pixel value in the second line;

searching for a combination of the first and second estimate pixel values minimizing the first calculation value; and calculating an interpolation pixel value from the pixel values of the first and second lines corresponding to the combination of the first and second estimate values minimizing the first calculation value.

* * * * *